United States Patent [19]

Sanders et al.

[11] Patent Number: 5,398,396
[45] Date of Patent: Mar. 21, 1995

[54] METHOD AND APPARATUS FOR WITHDRAWING A MACHINE SHAFT

[75] Inventors: Clifton L. Sanders, Wauwatosa; Harvey J. Kallenberger, Wind Lake, both of Wis.

[73] Assignee: Harnischfeger Corporation, Brookfield, Wis.

[21] Appl. No.: 23,363

[22] Filed: Feb. 26, 1993

[51] Int. Cl.⁶ .................. B23P 19/00; B23P 11/00; B62D 51/06; E02F 3/48
[52] U.S. Cl. ..................... 29/426.5; 29/252; 29/434; 29/700; 37/394; 37/395; 37/397; 180/8.5; 180/8.6
[58] Field of Search ................. 37/397, 396, 395, 394, 37/466, 231, 235, 236; 414/681, 719; 29/252, 426.5, 428, 434, 464, 700, 802, 901; 180/8.5, 8.6; 254/DIG. 1, DIG. 4, 101; 305/1, 2

[56] References Cited

U.S. PATENT DOCUMENTS

| | | | |
|---|---|---|---|
| 1,325,964 | 12/1919 | Templeton | 254/DIG. 1 X |
| 1,653,126 | 12/1927 | Schwerin | 254/101 |
| 2,297,556 | 9/1942 | Hermann | 254/DIG. 1 X |
| 2,399,417 | 4/1946 | Wilson et al. | 37/397 X |
| 4,038,765 | 8/1977 | Sankey et al. | 37/397 |
| 4,138,876 | 2/1979 | Chisum | 254/DIG. 1 X |
| 4,329,795 | 5/1982 | Kalve | 37/397 |
| 5,040,314 | 8/1991 | Kalve | 37/397 |
| 5,121,561 | 6/1992 | Palfreyman | 37/395 |
| 5,154,012 | 10/1993 | Kallenberger | 37/397 |
| 5,154,013 | 10/1993 | Kallenberger | 37/397 |
| 5,245,882 | 9/1993 | Kallenberger | 37/395 X |

Primary Examiner—Randolph A. Reese
Assistant Examiner—Andrea Chop
Attorney, Agent, or Firm—Jansson & Shupe, Ltd.

[57] ABSTRACT

The new method relates to a machinery assembly having (a) a housing, (b) an eccentric confined in the housing, (c) a shaft extending into the eccentric and (d) a shaft axis of rotation. A method for moving the shaft with respect to the housing includes the steps of applying a support force at a point on the housing so that such force places the housing substantially in equilibrium with respect to the axis. A withdrawing force is then applied to the shaft in a direction generally parallel to the axis. A jacking mechanism contacts the housing at a point to apply a support force to such housing. The force magnitude and direction place the housing substantially in equilibrium with respect to the axis to reduce or eliminate frictional forces.

12 Claims, 5 Drawing Sheets

METHOD AND APPARATUS FOR WITHDRAWING A MACHINE SHAFT

FIELD OF THE INVENTION

This invention is related generally to powered machinery and, more particularly, to machinery transmitting power from a prime mover through a mechanical drive train.

BACKGROUND OF THE INVENTION

Machinery powered by electric motors or internal combustion engines (typically referred to as "prime movers") often use gears, shafts and the like to form a drive train providing power used to perform an end-use function. Automobiles, metal cutting and shaping machines, toggle-type presses and construction and earth-moving machines are but a few examples of such machinery.

As more specific examples, such machinery drive trains uses gears and shafts in speed reducers and right angle drives to reduce speed (from that of the motor or engine output shaft) and increase torque and/or to change the direction of power flow. Shafts interconnect "stages" of gearing or connect a final gearing stage to an output device such as automobile wheels, press head or, in the case of an earth-moving machine known as a walking dragline, to a "walk leg" drive.

In such machines, the drive train components (gears, shafts and the like) range in size from a few pounds to several thousand pounds. Clearly, small drive train components can be readily lifted, manually placed and positioned by one or two maintenance workers. Equally clear is the fact that assembly and maintenance personnel working with very large drive train components usually need auxiliary lifting equipment, a crane or the like, to help them lift, place and service such components.

To keep the machine functioning efficiently and in condition to satisfactorily perform its task, worn parts including drive shafts need to be serviced or replaced. However, with larger machines, maintenance and parts replacement can be an imposing challenge, especially if the parts are large and unwieldly. Nowhere is this more true than in large mobile machines such as earth-moving and earth-excavating machinery.

Such machinery is available in a wide variety of types ranging from the familiar rubber-tire mounted and crawler-mounted to the less-common dragline. A dragline is often used for removing top soil and "overburden" to expose a valuable mineral, e.g., coal, beneath but near the earth's surface.

Draglines are equipped with an angularly-extending boom from which is suspended a "bucket" having an open mouth and digging teeth, both toward the main portion of the machine. Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

Smaller draglines are crawler mounted much like a military tank and capable of movement in the same way albeit at much slower speeds. However, as draglines (and their digging buckets) increased in size, crawler mounting was found to be impractical and in the early 1900's, the "walking" dragline was developed. The walking dragline is so named because it takes short "steps" and uses a "walk leg" mechanism (which resembles a human leg) to do so. A difference is that in a walking dragline, both legs step simultaneously.

To give some perspective to the following discussion, a large walking dragline—made by Harnischfeger Industries of Milwaukee, Wis., and incorporating the invention—has a main housing portion (including the machinery deck, operator's cab and the like) which is about 105 feet long, about 80 feet wide, about 40 feet high and weighs about nine million pounds. The boom extends about 300 feet and the capacity of the digging bucket is about 80 cubic yards. The walk legs of such dragline take steps about seven feet in length.

At least because of its size, weight and complexity, several problems attend draglines of earlier configuration. One is that such machines are usually used in remote sites and replacement parts are difficult to deliver and, because of their size and weight, even more difficult to install. Another problem attends components, the weight of which is supported partly or entirely on a driving or driven shaft.

The walk leg assembly of a walking dragline is but one example in that a good portion of its weight is supported by the shaft which drives the assembly eccentric through engaged splines or the like. Sooner or later, it will become necessary to partially or fully withdraw the shaft for servicing the walk leg assembly or the shaft itself. When so doing, the shaft must be relieved of the weight of the assembly so that the frictional "drag" forces resisting withdrawal become very modest and the shaft can be more easily moved along its axis.

Heretofore, the technique for "unloading" the shaft involved using a crane or other lifting device to lift the assembly slightly upward. When a crane is used, it is a virtual necessity that the area above the assembly be open so that the lifting slings, hook or the like can be manipulated. But it is not unusual for the area above the assembly to be occupied by some sort of housing structure which must first be removed before crane attachment to the assembly can occur.

Wear cannot be avoided in any machine assembly having relatively moving parts. But the efforts of earlier designers in this field have not been entirely successful in reducing "downtime" of a machine which represents a very substantial capital investment. As an example, a walking dragline of the type described above represents an investment of in excess of $20,000,000. Its cost of operation may be in the range of $400 per hour. Clearly, even a minute of downtime is enormously expensive when measured against such cost of operation and lost production.

A method and related apparatus which dramatically eases the task of shaft withdrawal, which slashes downtime and which, as to the apparatus, is machine-mounted would be an important advance in the art.

OBJECTS OF THE INVENTION

It is an object of the invention to overcome some of the problems and shortcomings of the prior art.

Another object of the invention is to provide a new method and apparatus for withdrawing a shaft from a machine assembly.

Another object of the invention is to provide a new method and apparatus which eases the task of shaft withdrawal.

Still another object of the invention is to provide an improved method and apparatus which reduces machine downtime.

Another object of the invention is to provide a new method and apparatus which helps avoid use of a crane in repairing heavy machine assemblies. How these and other objects are accomplished will become more apparent from the following descriptions and the drawing.

SUMMARY OF THE INVENTION

The inventive method and apparatus are responsive to a need to be able to axially move or remove (for, e.g., maintenance) a shaft with respect to a housing. The need is particularly evident in a machine assembly of the type where the weight of the housing is supported at least in part by the shaft and, therefore, where the frictional forces preventing shaft axial movement are high. The invention involves creative use of forces and force vectors which are part of the field of engineering mechanics.

The apparatus and method involve moving a shaft with respect to a housing. Since such apparatus attains equilibrium with respect to the shaft axis (thereby substantially eliminating frictional forces on the shaft which impede axial shaft movement), the shaft axis of rotation is the "reference axis" for the force analysis set forth below and is the moment axis for the analysis of moments of force.

An aspect of the invention relates to a machinery assembly having (a) a housing, (b) an eccentric confined in the housing, (c) a shaft extending into the housing and (d) a shaft axis of rotation. A method for moving the shaft with respect to the housing and eccentric includes the steps of applying a support force at a point on the housing. In an exemplary arrangement, the point of application of the support force is below the shaft axis. Such support force is of a magnitude and acts in a direction such that the support force places the housing substantially in equilibrium with respect to such axis.

When in equilibrium, the frictional forces on the shaft (which would otherwise prevent or at least significantly impair relatively easy shaft withdrawal) are substantially eliminated. A withdrawing force is then applied to the shaft in a direction generally parallel to or coincident with the shaft axis of rotation until the shaft has been withdrawn to the desired position or has been totally withdrawn and removed, as required.

As explained in greater detail below, there may be one or more horizontal and/or vertical forces acting upon the shaft axis and/or one or more moments of force acting thereon. In one instance, the horizontal force acts along a horizontal axis spaced from the moment axis by a first distance. The first force component acts along an axis spaced from the moment axis by a second distance and the algebraic sum of (a) the product of the horizontal force and the first distance and (b) the product of the first component and the second distance is substantially zero. As will become more clear from the detailed explanation below, each product constitutes a moment of force.

Of course, the housing center of gravity may or may not be coincident with or vertically spaced (up or down) from the shaft axis of rotation which, in the preferred assembly and method, constitutes the moment axis. When such center of gravity is not "axis coincident" or vertically spaced therefrom, the housing will have a moment of force acting thereon which results from the housing's own weight.

In a specific example of the inventive method, the machinery assembly is embodied as a walk leg assembly having an eccentric with a center of gravity spaced from the axis of rotation. The support force application step is preceded by the step of positioning the eccentric so that its center of gravity is vertically spaced from (and preferably vertically spaced below) the axis of rotation.

Other aspects of the invention also relate to the aforementioned machinery assembly and its housing, shaft and shaft axis of rotation. Such aspects involve an improved apparatus comprising a jacking mechanism extensible to contact the housing at a point and apply the support force thereto. The jacking mechanism includes a jack mounted for movement about a pivot axis and having a distal end to contact the housing at any of a plurality of points on the housing. If the forces and moments of force acting on the assembly and its eccentric tend to vary (a relatively unlikely situation), the jack can be pivoted so that the support force is properly "vectored" against the housing to help bring such housing and eccentric into equilibrium. More specifically, the jack is elongate and defines a force axis angularly adjustable with respect to the axis of rotation.

On the other hand, the detailed description discusses a specific embodiment and tells how to help avoid forces and moments of force which vary. For such a situation, the forces and moments of force acting on the housing can be determined with reasonable accuracy. The point at which the jacking mechanism is to contact the housing, the angle of contact and the force required at the point of contact can then be determined, all for the purpose of bringing the eccentric into equilibrium and permit relatively easy withdrawal of the shaft. Since in this instance, neither the angle nor the point of contact is likely to change and the jack may not need to be pivotable. And if the jacking mechanism is a fluid cylinder (hydraulic or pneumatic), the desired contact force can be correlated with a cylinder pressure. Then it is only necessary to raise cylinder pressure to the desired value in order to obtain a force of the proper magnitude to bring the housing into force and moment equilibrium.

In a specific exemplary embodiment involving a walk leg assembly on a walking dragline, the machinery assembly includes a housing, a knee link pivotably pinned to the housing and an eccentric confined in the housing and driven by the shaft. The center of gravity of the eccentric, which is not coincident with the shaft axis of rotation, can (unless properly located preparatory to shaft withdrawal) create a moment of force acting on the housing and on the shaft. Further details regarding the invention are set forth in the following detailed description taken in conjunction with the drawing.

DETAILED DESCRIPTION OF THE PREFERRED EMBODIMENTS

Figure 1:
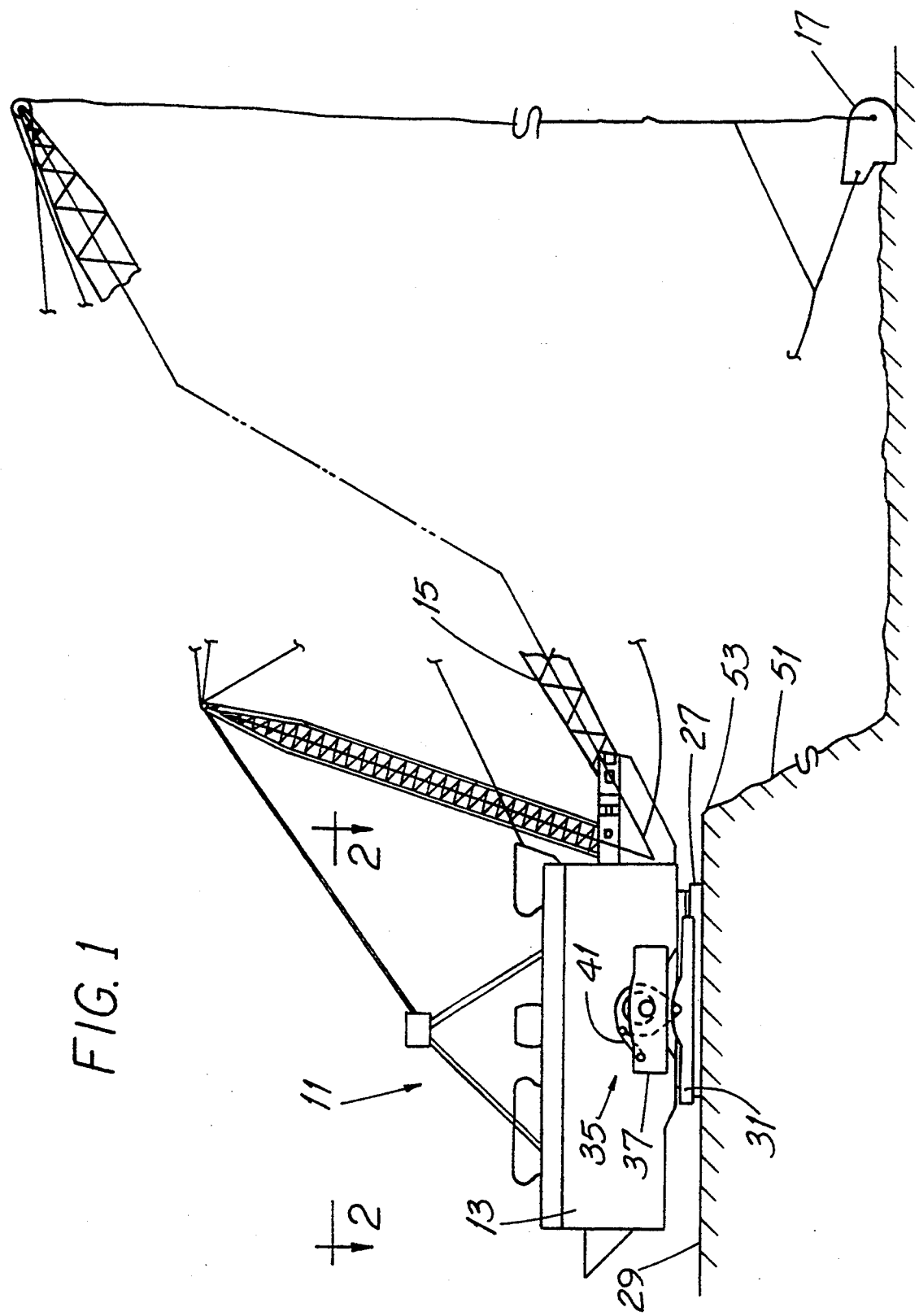
FIG. 1 is a representative side elevation view of a walking dragline.

The inventive method for moving a shaft 55 with respect to a housing 37 involves analyzing the horizontal and vertical forces acting with respect to the shaft axis 57 and also analyzing the moments of force acting with respect to such axis 57. The horizontal forces are added algebraically as are the vertical forces and as are the moments of force. And unless the line of action of a horizontal force and/or a vertical force intersects the shaft axis 57, such force(s) are also included in the moments-of-force summation.

A support force of a selected magnitude and direction is applied to the housing 37 at a selected point 59. Such magnitude and direction and the point of application are selected to "zero out" the algebraic addition of the horizontal forces, the algebraic addition of the vertical forces and the algebraic addition of the moments of force. Stated another way, the support force cancels the horizontal force(s), the vertical force(s) and the moment(s) of force.

Before describing the preferred embodiments, it should be appreciated (and persons of ordinary skill will appreciate) that the improved apparatus 10 and method are applicable to stationary mounted "in-factory" machines as well as to mobile machinery. The invention clearly offers convenience in machines of moderate size and becomes more compelling as the size of the machine increases. To help "dramatize" and emphasize this fact, the invention is disclosed in connection with one of the largest types of machines in the world, a walking dragline 11.

Figure 2:
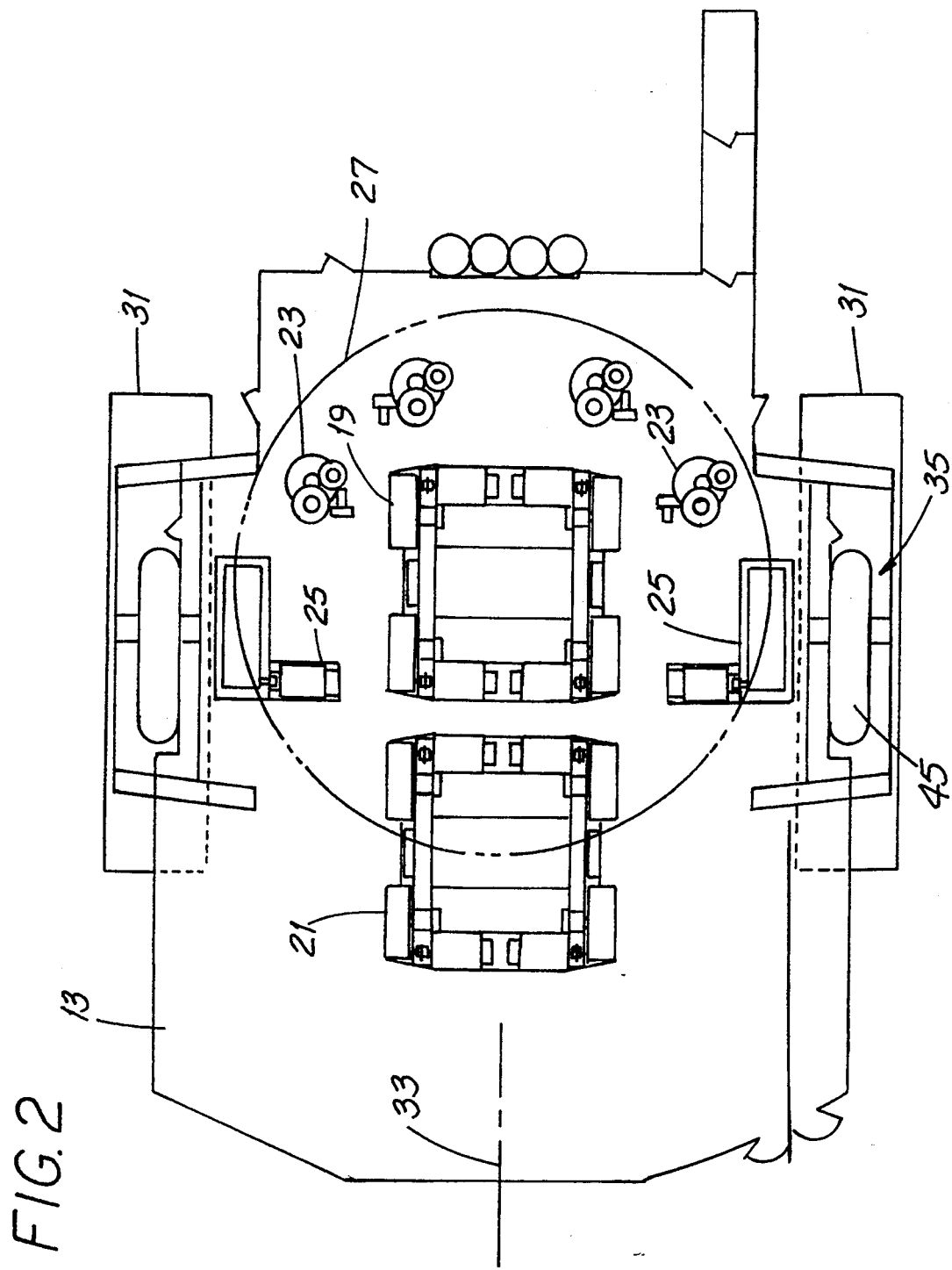
FIG. 2 is a top plan view, in phantom, of the main housing portion of the dragline of FIG. 1, taken along the viewing plane 2—2 thereof and with parts broken away.
Figure 3A:
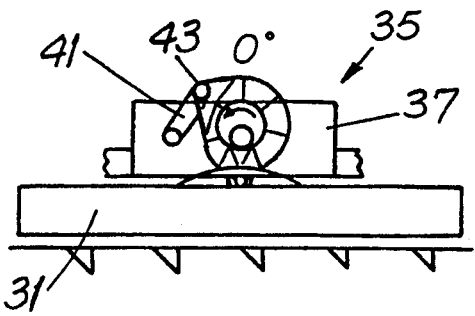
FIGS. 3A-3G show a sequence of operation of one of the walk legs of the dragline of FIG. 1.
Figure 3B:
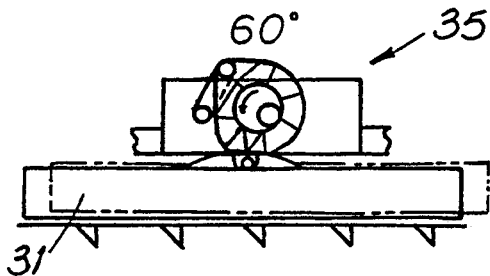
Figure 3C:
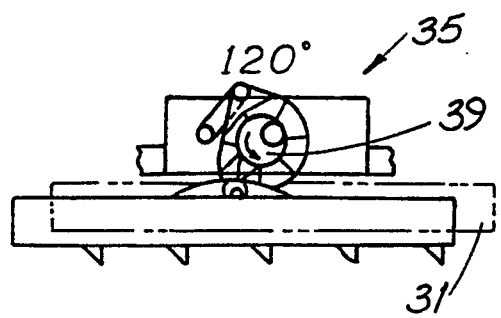
Figure 3D:
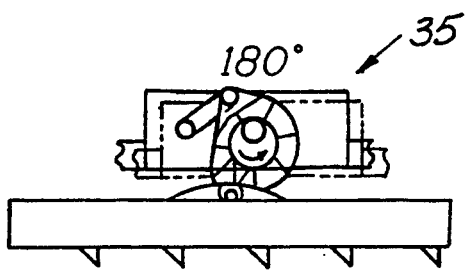
Figure 3E:
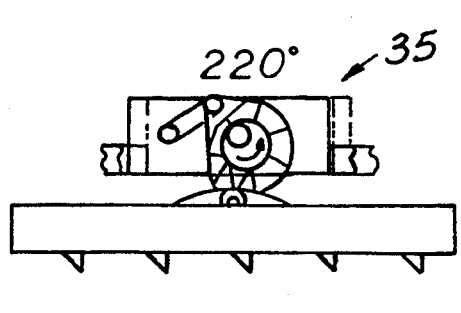
Figure 3F:
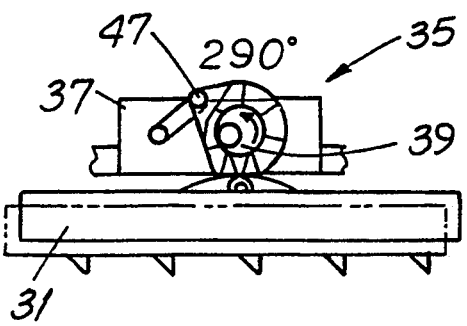
Figure 3G:
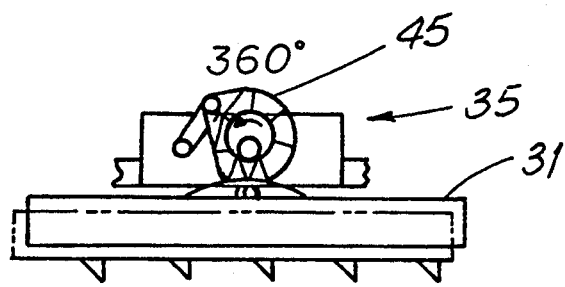

Referring first to FIGS. 1 and 2, an exemplary walking dragline 11 includes a main housing portion 13 having a boom 15 extending therefrom to support and manipulate a digging bucket 17. Within the housing portion 13 are mounted the bucket hoist, bucket drag and swing systems 19, 21 and 23, respectively. The drive 25 for the "walking" system is also mounted therein. When digging, the dragline 11 sits on and pivots about a generally circular "tub" or platform 27 which rests on the earth's surface 29.

The dragline 11 also includes a pair of pads or "shoes" 31 which, when moved in unison as described below, lift the platform 27 and move the dragline 11 rearward away from the bucket 17. Movement in the exemplary dragline 11 is in "steps" of about seven feet in length and along the long axis 33 of the main housing portion 13.

Referring additionally to FIGS. 3A–3G and FIG. 4, a walk-like mechanism 35 typically includes a main housing structure 37, a driven eccentric 39 and a knee link 41. The knee link 41 has its upper end 43 coupled to the walk leg housing 45 by a pin 47 to permit relative rotation of a few degrees between the link 41 and the housing 45. The lower end of the knee link 41 is similarly coupled to the nearby main housing structure 37. As a rough analogy, the coupling at the upper end 43 of the link 41 is analogous to the human knee and the eccentric 39 is analogous to the human hip joint. In FIGS. 3C, 3F, 4 and 5, numeral 39 identifies the eccentric.

As the eccentric 39 is driven counterclockwise (in FIG. 4 and in the right-side sequence of FIGS. 3A–3G) through one revolution, the shoe 31 is lowered to ground contact and the dragline 11 lifted and moved rearward. The shoe 31 is then raised until the platform 27 again rests on the surface 29.

Since the bucket 17 is drawn toward the dragline 11, removal of overburden 51 progresses toward the dragline 11 until the edge 53 of the pit becomes relatively near to the dragline 11. Therefore, the dragline 11 must occasionally be moved rearward a few feet to expose additional overburden 51 for digging.

The inventive apparatus 10 and method involve creative use of forces and force vectors which are part of the field of engineering mechanics. As used in this specification, the term "equilibrium" means that (a) the respective algebraic sums of the horizontal forces and of the vertical forces acting on the housing are each substantially zero, and (b) the algebraic sum of the moments of force acting on the housing is substantially zero with respect to a reference axis, namely axis 57.

Figure 4:
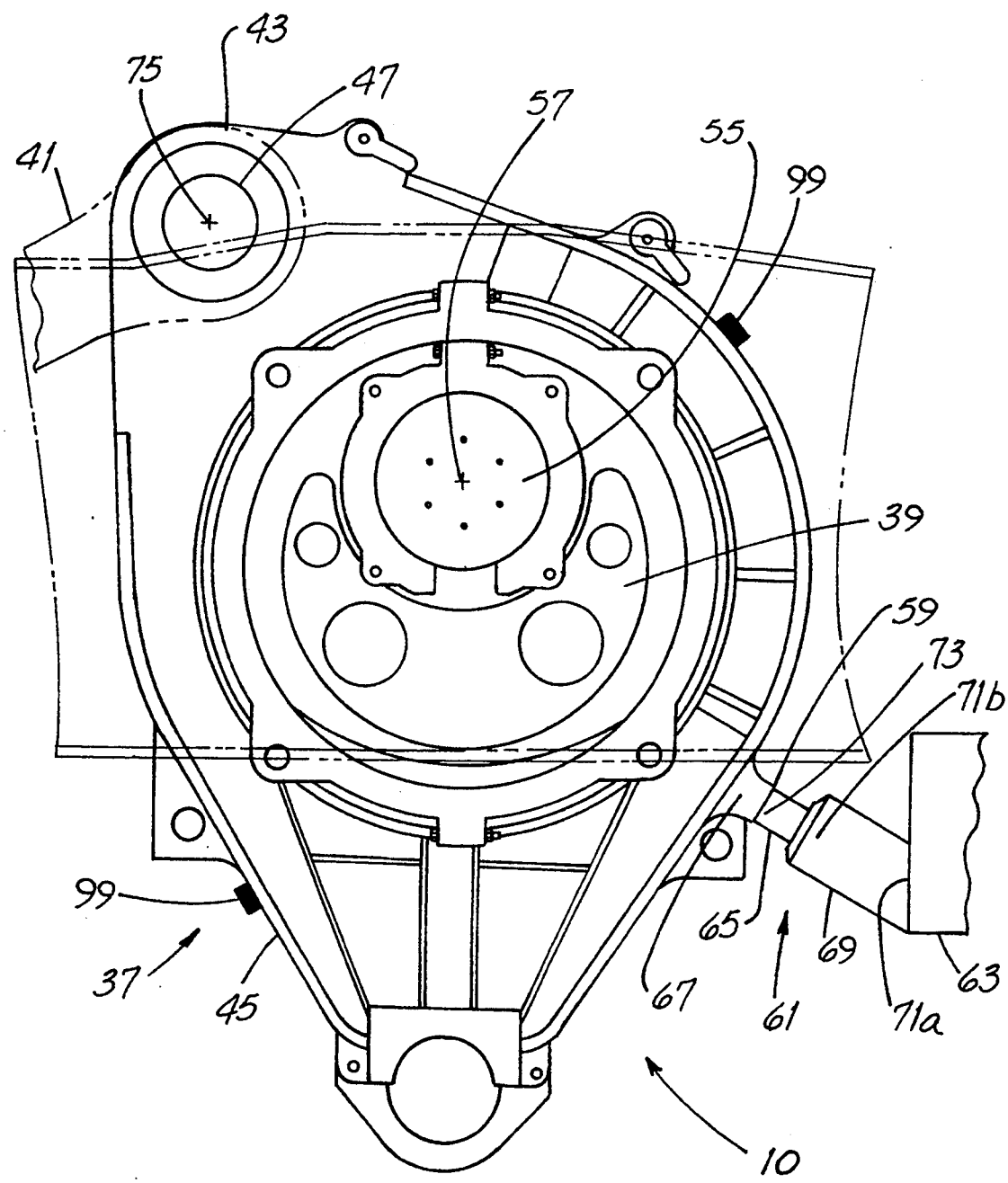
FIG. 4 is an elevation view of a walk leg assembly with adjacent parts shown in phantom outline and broken away.

Referring further to FIG. 4, an aspect of the invention relates to a machinery assembly which includes the exemplary walk leg eccentric housing 45. A shaft 55 extends into the housing 45 and includes a shaft axis of rotation 57. A jacking mechanism 61, resembling a fluid cylinder (hydraulic or pneumatic), is attached to a nearby support structure 63 and has a rod 65 which extends to contact the housing 45 at a point 59 and apply a support force to such housing 45. The support force may be applied directly to the housing 45 or, more preferably, to a projecting pad 67 provided for the purpose and in this specification, phrases like "contact the housing" contemplates either arrangement.

The jacking mechanism 61 includes an elongate jack 69 mounted for movement about a pivot axis 71 which may be at location 71a or at location 71b. Mounting for pivoting movement is preferred so that the jack distal end 73 can be extended to contact the housing 45 at any of a plurality of points 59 on the housing 45. That is, if the forces and moments of force acting on the housing 45 tend to vary (a relatively unusual situation), the jack 69 can be pivoted so that its force axis (coincident with force F7) is angularly adjustable with respect to the axis of rotation. The resulting support force F7 can thereby be properly "micro-vectored" (moved angularly a very small amount) against the housing 45 to help bring such housing 45 into equilibrium.

Understanding of the following will be aided by first understanding some details of the relationships (and especially clearances) between the housing 45 and the eccentric 39 and between the eccentric 39 and the shaft 55. There is a clearance between the housing 45 and eccentric 39 which permits the housing 45 to be moved slightly, e.g., lifted, with respect to the eccentric 39 without disturbing such eccentric 39.

On the other hand, there is virtually no clearance between the eccentric 39 and the shaft 55 passing through it. Therefore, it is not practically possible to lift the eccentric 39 to remove its weight from the shaft 55 to facilitate shaft withdrawal. The invention contemplates placing the housing 45 in force and moment-of-force equilibrium so that at least the eccentric 39 and shaft 55 are freed of the effect of the housing 45. The frictional forces between the shaft 55 and eccentric 39 are thereby greatly reduced and the shaft 55 can be more easily withdrawn.

While the location of the center of gravity 77 of the eccentric 39 with respect to the axis 57 is not a consideration when placing the housing 45 in force and momentof-force equilibrium, it is a consideration when analyzing other forces acting on the shaft 55 and impeding its withdrawal. Specifically, if such center of gravity 77 is at a position other than directly vertically below the axis 57, the eccentric 39 will exert torque on the shaft 55 and make such shaft 55 more difficult to withdraw. It is parenthetically noted that such center of gravity 77 may also be directly vertically above the axis 57 and provide the same torque-eliminating result but with decreased stability.

The specific exemplary embodiment involves the housing 45 with a knee link 41 attached at a point 75 which can be determined with respect to the axis of rotation 57. Similarly, other parameters such as weight of the housing 45, weight of the knee link 41, location of the center of gravity 77 of the eccentric 39 and the location(s) of other center(s) of gravity (described in more detail below) can be determined. Thereupon, the forces and moments of force acting on the housing 45 can be determined with reasonable accuracy and will not vary significantly. And by properly locating the center of gravity 77 with respect to the axis 57, torque on the shaft 55 can also be substantially eliminated.

In such a situation, the point 59 at which the jack 69 contacts the housing 45 and the angle "A1" at which the required supportive force F7 is applied at such point 59 can be determined. Neither the angle nor the point of contact is likely to change and the jack 69 may not need to be pivotable. And if the jacking mechanism 61 is a hydraulic cylinder or similar thereto, the desired contact force can be correlated with a cylinder pressure. Then it is only necessary to raise cylinder pressure to the desired value in order to obtain a force of the proper magnitude to bring the housing 45 into force and moment equilibrium.

In appreciating this part of the specification, it will be helpful to have an understanding of the concept of "center of gravity" or "CG." All objects having mass and weight have a center of gravity which means that for purposes of analyzing forces and moments external to the object, all of the weight of the object appears to be concentrated at a single point, namely, the center of gravity.

Figure 5:
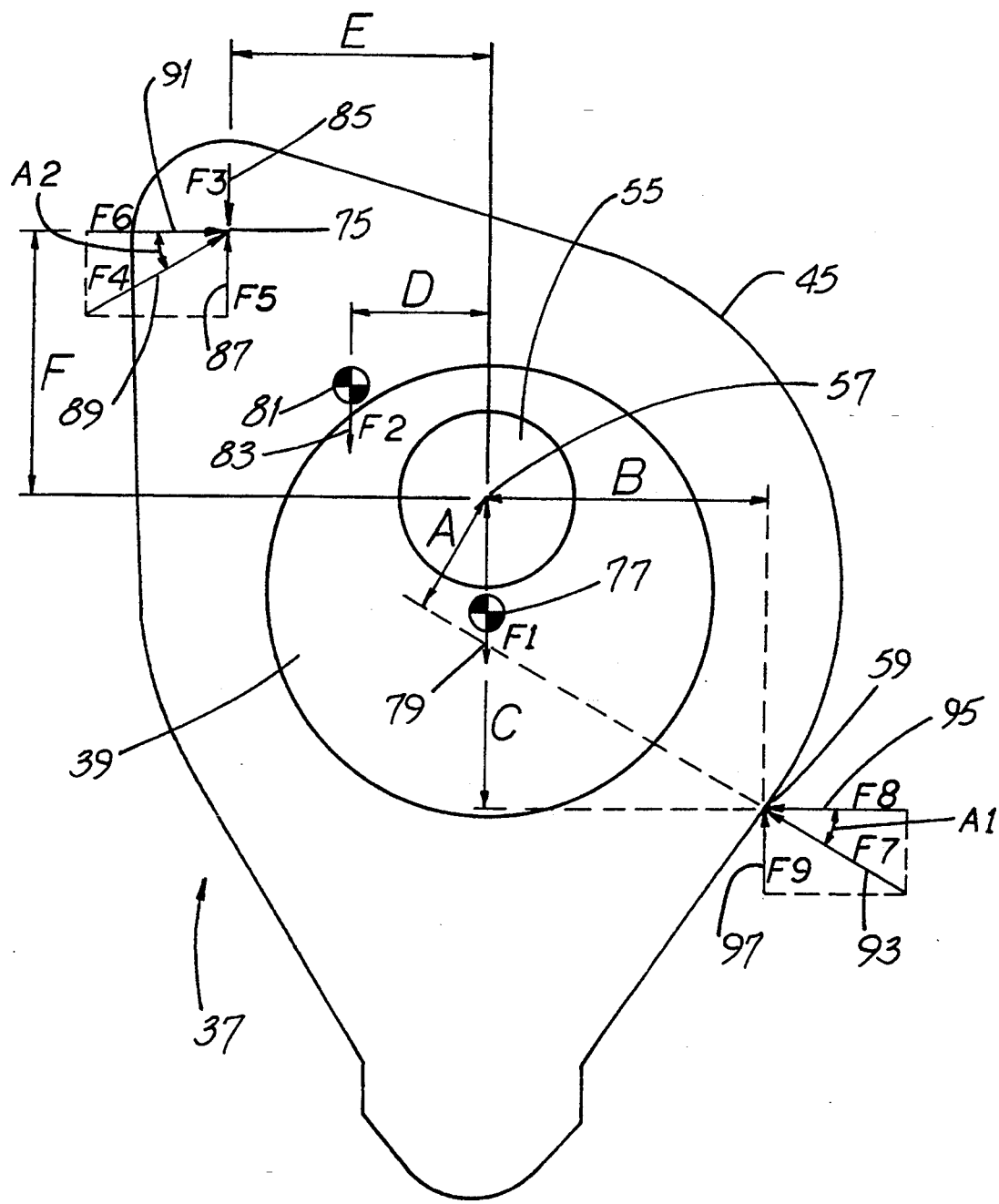
FIG. 5 is a depiction of the walk leg assembly of FIG. 4 and showing various forces and moments of force acting upon the assembly shaft axis.

Referring now to FIG. 5, the various forces and moments of force acting upon the shaft axis 57 will now be described. The eccentric 39 has a center of gravity 77 which is not coincident with the shaft axis of rotation 57 and the weight of such eccentric 39 is represented by the arrow 79. Such center of gravity 77 can (unless properly located preparatory to withdrawal of the shaft 55) create a moment of force about the shaft axis 57.

For example, if the center of gravity 77 was located at the 9 o'clock position with respect to the shaft axis 57, the weight of the eccentric 39 would create a counter-clockwise (CCW) moment of force about such axis 57 which is equal to the weight of the eccentric times the horizontal distance of the center 77 from the axis 57. Therefore, in situations involving a center of gravity, like center 77, which is non-coincident with the axis 57, it is preferred that if possible, the component (e.g., the eccentric 39) be rotated or otherwise re-positioned so that such center 77 is directly vertically below the axis 57 as illustrated in FIG. 5. The force F1 resulting from the weight of the eccentric 39 is represented by arrow 79. While such center 77 nevertheless creates a force imbalance with respect to the axis 57 (simply because it is not coincident with such axis 57), it does not then create a moment of force about such axis 57.

Similarly, the housing 45 also has a center of gravity 81 which, in the exemplary embodiment, is not coincident with the shaft axis 57. Since the housing 45 is pinned to the knee link 41, it is both impractical and undesirable (and, with the invention, unnecessary) to attempt to rotate the housing 45 so that its center 81 is also directly below the axis 57. Therefore, the housing 45 creates a CCW moment of force about the axis 57 which is equal to the weight of the housing 45 (represented by the arrow 83) multiplied by the horizontal length "D" of its moment arm. However, the housing 45 is not the only component creating a moment of force about the shaft axis 57.

The knee link 41 is attached to the housing 45 by a pin 47 and the weight of the pin 47 and a portion of the weight of the link 41 (the other portion of which is supported at its other end, not shown) is borne by the housing 45. These combined weights act vertically downward at the pin center axis coincident with point 75. The force and force direction resulting from such combined weight is represented by the arrow 85 which, for purposes of explanation, is illustrated as being above the arrow 87. The link 41 and pin 47 thus create a CCW moment of force about the axis 57 which is equal to the combined effective weight at that point 75 multiplied by the horizontal length "E" of its moment arm.

It is also to be appreciated that the link 41, which is angled upward and to the right as shown in FIG. 4, provides an angular force supporting the housing 45 and eccentric 39. The magnitude and direction of such force are represented by the arrow 89. It is to be appreciated that the angle "A2" is determined by a line through the center of pin 47 (coincident with point 75) and through the center of the pin (not shown) on the other end of link 41.

One way to analyze the moment of force about the axis 57 resulting from the link supporting force is to multiply the magnitude of such force by the perpendicular distance between the arrow 89 (or an extension thereof) and the shaft axis 57. However, another analytical approach, perhaps more broadly useful, is to "resolve" the arrow 89 into its horizontal and vertical force components as graphically represented in FIG. 5 by arrows 91 and 87, respectively. Such horizontal and vertical force components (which are assumed to act in lieu of the force represented by the arrow 89) produce an effect identical to that produced by the angular force represented by such arrow 89 at point 75.

From the foregoing, it is apparent that the force represented by the vertical arrow 87 creates a clockwise (CW) moment of force about the axis 57, the magnitude of such moment being the magnitude of the force (arrow 87) multiplied by the length "E" of its moment arm. Similarly, the horizontal arrow 91 creates a CW moment of force about the axis 57, the magnitude of such moment being the magnitude of the force (arrow 91) multiplied by the length "F" of its moment arm.

Stated more generally, factors including weights and support forces produce one or more forces and/or one or more moments of force with respect to a shaft axis 57. In the following explanation, each arrow 83, 85, 87, 89, 91 represents a force with arrow 83 being denoted as F2, arrow 85 as F3, arrow 89 as F4, arrow 87 as F5 and arrow 91 as F6. Force representation arrows 93, 95 and 97, discussed below, are denoted as F7, F8 and F9, respectively.

As will become apparent, the forces F1–F3, F5, F6, F8, F9 in the exemplary embodiment must be taken into account when making horizontal and vertical force summations and the moment-of-force summation. Force F4 can be used in lieu of forces F5, F6 and/or force F7 can be used in lieu of forces F8, F9.

In the exemplary depiction, the moments of force are (in the order discussed above and with indications of the directions of such moments) (a) housing weight F2 multiplied by length "D" of moment arm (CCW), (b) knee link/pin weight F3 multiplied by length "E" of moment arm (CCW), (c) a vertical link support force F5 multiplied by the length "E" of moment arm (CW), and (d) a horizontal link support force F6 multiplied by the length "F" of moment arm (CW).

A method for moving the shaft 55 with respect to the housing 45 includes the steps of applying a support force at a point 59 on the housing 45. In an exemplary arrangement, the point 59 of application of the support force is below the shaft axis 57. Such support force, represented by the arrow 93 and denoted as F7, is of a magnitude and acts in a direction and through a moment arm of length "A" such that the support force F7 places the housing 45 substantially in equilibrium with respect to the axis 57. The support force F7 can, like the force F4, be resolved into separate force components, i.e., horizontal and vertical components F8 and F9, respectively.

And it should be appreciated that any force F2–F9 can be assumed to be made up of two or more smaller forces, e.g., first and second force components, acting in the same direction. For example, if the force F8 has a value of 1500 pounds, two force components, one of 600 pounds and one of 900 pounds acting in the same direction produce an effect identical to force F8.

The housing 45 may have one or more horizontal and/or vertical forces acting upon it (e.g., forces F2, F3, F5 and F6) and may also have one or more moments of force acting upon it such as the moments mentioned above. As will become more clear from the detailed explanation below, each product of a force and a distance (i.e., a moment arm) constitutes a moment of force.

Of course, the center of gravity 81 of housing 45 may or may not be coincident with or vertically spaced (up or down) from the shaft axis of rotation 57 which, in the preferred assembly and method, constitutes the moment axis. When such center of gravity 81 is not "axis coincident" or vertically spaced therefrom, the housing 45 will have a moment of force acting thereon which results from the housing's own weight.

An analysis of the exemplary arrangement shown in FIG. 5 will now be set forth. The purpose of the analysis is to determine (a) the location of the point 59 at which the support force F7 (or the "effect-equivalent" forces F8 and F9) is to be applied, (b) the resulting angle A1 at which such support force F7 is applied, and (c) the magnitude of such support force F7, all for the purpose of placing the forces acting on the housing 45 in substantial equilibrium with respect to the shaft axis 57.

Since forces and moments of force are algebraically summed, some exemplary "rules," sometimes called a "convention," used in doing so are set forth. For horizontal forces, all such forces acting left-to-right in FIG. 5 (force F6, for example) are called positive forces and those acting right-to-left are called negative forces. For vertical forces, those acting upward are called positive forces and those acting downward are called negative forces. For moments of force, those acting CW are called positive moments and those acting CCW are called negative moments. Of course, any some or all of the conventions noted above can be oppositely "signed" so long as the adopted convention is used consistently throughout the analysis.

A more specific example based on FIG. 5 will now be provided and in such example, the algebraic signs are included. The vertical forces to be summed (noted with their algebraic signs) are $-F2$, $-F3$ and $+F5$. The sole horizontal force is $+F6$. It will be noted that the force components F5 and F6 of force F4 have been used in lieu of force F4 since such components F5 and F6 are vertical and horizontal, respectively. Of course, the values of forces F8 and F9 cannot be assumed. They will depend upon what forces are needed to "zero out" the summation equations. Similarly, the moments of force about axis 57 are algebraically summed. Such moments of force include $-F2 \times D$, $-F3 \times E$, $+F5 \times E$ and $+F6 \times F$.

The methodology is used to develop equations equal in number to the number of unknowns. The following is helpful in developing such equations. In the specific example shown in FIG. 5, F6 and F8 will be equal in magnitude since they are the only horizontal forces acting on the housing 45. Similarly, F9 must be opposite in algebraic sign and equal in magnitude to the algebraic sum of F2, F3 and F5. Force F5 can be expressed as a function of F6, i.e., $F5 = F6 \times \tan A2$. Similarly, force F9 can be expressed as a function of F8, i.e., $F9 = F8 \times \tan A1$. And, of course, one knows the shape of the housing 45 and, therefore, the horizontal and vertical distances from the axis 57 of any point along the edge of such housing 45.

The equations can then be solved simultaneously to obtain the values of the forces F8 and F9 (or the equivalent force F7 and its angle A1 from the horizontal). If the shape of the housing 45 is expressed by a mathematical equation, then such equation solution also yields the lengths "B" and "C" of the moment arms. One is thereby able to compute not only the required force and force angle to place the housing 45 in equilibrium but also the location of the point 59 on the housing 45 at which the support force is applied.

When in equilibrium (and assuming the center of gravity 77 of the eccentric 39 has been positioned as described above), the frictional forces on the shaft 55 (which would otherwise prevent or at least significantly impair relatively easy shaft withdrawal from the housing 45) are greatly reduced, leaving substantially only the weight of the eccentric 39 applying a friction force to the shaft 55. And if the machine on which the method is being employed is devoid of an eccentric 39 (or an eccentric-like component), such frictional forces are substantially eliminated. A withdrawing force is then applied to the shaft 55 in a direction generally parallel to or coincident with the shaft axis 57 until the shaft 55 has been withdrawn to the desired position or has been totally withdrawn and removed, as required.

In a specific example of the inventive method, the machinery assembly is embodied as a walk mechanism 35 having an eccentric 39 with a center of gravity 77 spaced from the axis of rotation 57. The support force application step is preceded by the step of positioning the eccentric 39 so that its center of gravity is vertically spaced from (and preferably vertically spaced below) the axis of rotation 57.

In the arrangement of FIGS. 4 and 5, the assembly components, e.g., the housing 45 and eccentric 39, will be relatively stable if the shaft 55 is only partially withdrawn. However, if the shaft 55 is completely withdrawn, the assembly (even though in equilibrium) tends toward instability. In that instance, retention brackets 99 may be used to further "steady" the housing 45 until the shaft 55 is replaced.

While the principles of this invention have been described in connection with specific embodiments, it should be understood clearly that these descriptions are made only by way of example and are not intended to limit the scope of the invention.

What is claimed is:

1. In a dragline walk leg assembly having (a) an eccentric housing, (b) a walk leg eccentric confined in the housing, (c) a shaft extending into the eccentric and (d) a shaft axis of rotation, a method for moving the shaft with respect to the housing and including the steps of:
 applying an upwardly-angled support force at a point on the housing below the axis of rotation to place the housing substantially in equilibrium with respect to the axis; and,
 applying a withdrawing force to the shaft in a direction generally parallel to the axis.

2. The method of claim 1 wherein the housing has at least one substantially horizontal force acting thereon and the support force includes a first force component canceling the horizontal force.

3. The method of claim 2 wherein:
 the axis of rotation constitutes a moment axis;
 the horizontal force acts along a horizontal axis spaced from the moment axis by a first distance;
 the first force component acts along an axis spaced from the moment axis by a second distance; and,
 the algebraic sum of (a) the product of the horizontal force and the first distance and (b) the product of the first force component and the second distance is substantially zero.

4. The method of claim 3 wherein the housing has a moment of force acting thereon which results from the housing weight.

5. The method of claim 4 wherein the point of application of the support force is below the moment axis.

6. The method of claim 1 wherein:
 the eccentric has a center of gravity spaced from the axis of rotation;
and the support force application step is preceded by the step of:
 positioning the eccentric so that its center of gravity is vertically spaced from the axis of rotation.

7. The method of claim 6 wherein the eccentric positioning step includes positioning the eccentric so that its center of gravity is vertically spaced below the axis of rotation.

8. In a dragline walk leg assembly having (a) a housing, (b) an eccentric confined in the housing, and (c) a shaft extending into the eccentric and having a shaft axis of rotation, the improvement comprising:
 a jacking mechanism extensible to contact the housing at a point and apply a support force at a nonvertical angle thereto and,
 the support force has a magnitude and acts in a direction to place the housing substantially in equilibrium with respect to the axis,
whereby frictional forces on the shaft are substantially reduced and the shaft may be readily moved with respect to the housing.

9. The dragline walk leg assembly of claim 8 wherein the jacking mechanism includes a jack mounted for movement about a pivot axis and having a distal end to contact the housing and apply a force thereto.

10. The dragline walk leg assembly of claim 9 wherein the jacking mechanism includes a fluid cylinder.

11. The dragline walk leg assembly of claim 8 wherein:
 the eccentric has a center of gravity spaced from the shaft axis of rotation.

12. The dragline walk leg assembly of claim 11 wherein the center of gravity is spaced vertically below the shaft axis of rotation.

* * * * *